United States Patent [19]
McComb et al.

[11] Patent Number: 6,006,224
[45] Date of Patent: Dec. 21, 1999

[54] CRUCIBLE QUERY SYSTEM

[75] Inventors: David W. McComb; James L. Long; Karin M. Boes, all of Fort Collins, Colo.

[73] Assignee: Organicnet, Inc., San Francisco, Calif.

[21] Appl. No.: 09/023,167

[22] Filed: Feb. 13, 1998

Related U.S. Application Data

[60] Provisional application No. 60/038,387, Feb. 14, 1997, provisional application No. 60/037,941, Feb. 14, 1997, and provisional application No. 60/038,390, Feb. 14, 1997.

[51] Int. Cl.⁶ .................................................. G06F 17/30
[52] U.S. Cl. .............................. 707/5; 707/102; 395/704
[58] Field of Search ..................... 707/1–10, 100–104, 707/200–206

[56] References Cited

U.S. PATENT DOCUMENTS

| | | | |
|---|---|---|---|
| 5,193,185 | 3/1993 | Lanter | 707/101 |
| 5,577,241 | 11/1996 | Spencer | 707/5 |
| 5,829,006 | 10/1998 | Parvathaneny et al. | 707/101 |
| 5,850,544 | 12/1998 | Parvathaneny et al. | 707/101 |

*Primary Examiner*—Ruay Lian Ho
*Attorney, Agent, or Firm*—Stuart T. Langley; Holland & Hart llp

[57] ABSTRACT

A database system including a query mechanism for accessing data stored in the database. The database system includes classes comprising stored code enabling User generated database queries comprise data indicating one or more addresses at which the desired data resides. The query mechanism parses a query in to a plurality of query components. A query class in the query system instantiates a query component object for each of the query components. The query component objects are chained together to form query chains that enable message passing between the query component objects.

11 Claims, 6 Drawing Sheets

CRUCIBLE QUERY SYSTEM

RELATED APPLICATIONS

The present invention relates to and claims priority from U.S. Provisional Application No. 60/038,387 entitled "SOFTWARE APPLICATIONS AS DATA" filed on Feb. 14, 1997, U.S. Provisional Application No. 60/037,941 entitled "CRUCIBLE QUERY SYSTEM" filed on Feb. 14, 1997, and U.S. Provisional Application No. 60/038,390 entitled "DEVICE INDEPENDENT WINDOW LAYOUT FOR GRAPHICAL DISPLAY OF INFORMATION" filed on Feb. 14, 1997.

The present invention relates to U.S. patent application Ser. No. 09/023,036 entitled "ORGANICWARE APPLICATIONS FOR COMPUTER SYSTEMS" and U.S. patent application Ser. No. 60/038,390 entitled "DEVICE INDEPENDENT WINDOW LAYOUT FOR GRAPHICAL DISPLAY OF INFORMATION", all assigned to the assignee of the present invention, filed concurrently herewith, the teachings of which are incorporated herein by reference in their entirety.

BACKGROUND OF THE INVENTION

1. Field of the Invention

The present invention relates, in general, to information systems, and, more particularly, to a database query system that is readily modifiable to adapt to new database hardware and software and applications.

2. Relevant Background

Although the field of information technology is characterized by rapid change, a significant problem leading to the obsolescence of information systems is the inability for the system itself to change. Traditional information systems are made from millions of lines of intricately interwoven code with data distributed throughout hundreds to thousands of interdependent tables. The conventional approach has been to closely couple a database management application to the database itself in an effort to minimize data access time. However, by closely binding the application to database, data restructuring requires that both the database and the application be modified. Also, interfaces to the database are application specific making it difficult to create interoperable and extensible applications. Further, the application specific management software is difficult to reuse in diverse applications.

In conventional systems, small changes made to improve and even maintain functionality may require a large expenditure of programming resources to ensure that the system continues to function after the change. In many cases, the changes simply cannot be effectively made. In these cases, the entire system is scrapped in favor of a new system providing the desired functionality. These changes cost the user millions of dollars in actual cost, and significant expenses in lost time.

Fundamental components of an information system include one or more databases and a database management system (DBMS). A database broadly refers to a collection of data that is usually related. A database management system is used to access information from one or more databases. A database management system comprises one or more software implemented application(s) that interface between a user and a database stored in the memory and mass storage of a computer. The database management system typically includes functionality to perform searching (i.e., querying), sorting, updating, and combining data in the databases. In other words, the database management system accepts user input, generates database access requests, and returns data to the user.

Most database management systems support structure query language (SQL), a standard database language used in querying, updating, sorting, and managing relational databases. Most database management systems also support SQL extensions that provide additional functionality and user interfaces features. In a typical client/server implementation, a database is stored on a database server. The database server has a database management program running that accepts user information from a plurality of client nodes coupled to the server by a communication network. On the client side, the client computer runs a database management application capable of accessing and sending appropriate information to the database server.

Conventional applications, even object oriented applications, are deployed as procedural code. A typical application comprises a plurality of modules that each perform a specified set of tasks. These modules are linked and compiled to provide executable code that implements the application. At runtime, the executable code is loaded into machine memory and provides the applications features and behavior by executing the specified set of tasks in the machine. Program compilation occurs before the application is deployed such that the application cannot be fundamentally changed at runtime. Although some applications can be customized by the addition of macros or add-in applications and extensions, these additions are themselves implemented by procedural code and must be added before runtime.

As software complexity increases, verification of the functionality (i.e., the features and behavior of the software) has become problematic. When an application comprises thousands or millions of lines of code it becomes impracticable to test or simulate every possible failure mode. Until applications are actually used in their intended environment, many problems or limitations remain unknown. This increases the cost of maintenance and support for the application. In many mission critical information system applications (e.g., medical, financial, and security) it is vital that an application be implemented only after verification is complete. What is needed is a reliable system that can adapt to provide new functionality without the delays and cost imposed by software verification.

Because of the extensive use of computers to store and manipulate data over the last several decades, a tremendous wealth of information is available in digital form stored in a variety of database systems. With the advent of network technology, wide area networks, and internetworks (i.e., networks of networks) the information stored in these databases is physically accessible. However, because these database systems are largely incompatible, this stored information is not practicably accessible to many applications. This problem is expected to become more acute as new database systems come on line with improved functionality and performance. A need exists for a database query system that is designed to adapt to accommodate data from any source from legacy systems to the newest object-oriented databases.

Existing information systems comprise database server software running on top of an operating system. The database engine accepts user queries using a structured syntax such as structured query language (SQL). Natural language interpreters are used to convert natural language queries into syntactically correct query language statements. A query often comprised a long series of query language statements that were only useful when used in a particular combination. Most often, the queries were executed and then destroyed. Some systems allowed the entire complex query to be saved for re-execution. However, when the characteristics of the database changed, re-execution often failed thereby requiring regeneration of a suitable query. A need exists for a query save and retrieve system that handles changes in the underlying database structure.

One limitation of conventional database applications is that in order to perform upgrades and even minor modifications and maintenance, the entire system must be brought down (i.e., halted) in order to install and verify the changes. This results in down time that is unacceptable in many applications. This downtime is required when procedural code is changed as most computer systems do not support dynamic code changes while the code is stored in memory of the computer. A need exists for an information system that allows for dynamically applied maintenance updates and upgrades without bringing the system down for installation and maintenance.

Another limitation of existing database systems is in the relationship traversal mechanism. In any database the stored information comprises a web of interrelated data. In previous systems it is an application such as a database engine that instantiates the database objects then interprets and creates the relationships between them based upon a user-supplied query. In these systems, queries form a series of object traversals, and once the system traverses from one object to another it has been difficult to get back to the original again. For example, an SQL query that involves traversals returns objects of the type specified at the end of the relation. This only enables reference to attributes and relationships that are defined in the type of object that is returned. In prior systems it is not possible to refer to attributes or relationships that are defined in a parent object that was traversed. In particular, when an object type is sub-typed (which frequently occurs as an information system evolves) the sub-types will not include all of the attributes and relationship definitions contained in the parent object type. Although a query language such as SQL can be forced support such traversal and return features, the procedural syntax required makes such operations difficult for the user. Such operations are even more difficult for a natural language interpreter to manage.

As a particular example in a medical services support application, writing a Select statement to find a patient based on attributes of the patient's physician and spouse has been difficult. In such a query, the physician and spouse objects are only reached by traversing the patient object that holds the data identifying the physician and spouse objects. However, once traversed, the one-way nature of the procedural query language fails to recognize the relationship of the database objects (i.e., the physician and spouse objects) to the original patient object. This feature of prior information systems makes it difficult to backtrack to the patient object to obtain the desired data from the patient object. A need exists for a database query system in which not only data, but also relationships and attributes of the database objects are stored with the database objects.

SUMMARY OF THE INVENTION

Briefly stated, the present invention involves a database system including a query mechanism for accessing data stored in the database. User generated database queries comprise query-language statements indicating one or more addresses at which the desired data resides. The query mechanism parses a query-language statement into a plurality query components. A query class in the query system instantiates a query component object for each of the query components. The query component objects are chained together to form query chains that enable message passing between the query component objects.

The query chains can be stored to persistent storage in the database system by storing each query component object in the class or subclass from which the query component object was constructed. In this manner, not only text describing the query components is saved, but also data describing attributes, relationships and the like that enable the query component to be rebuilt and reused. The query chain can be stored intensionally (i.e., in an un-executed state) or extensionally (i.e., saved with the actual result generated by the executed query). An extensional query does not need to be re-executed when it is rebuilt from the database. Queries can be nested within other queries. Persistent query chains can be named and the name then used within another subsequent query.

DETAILED DESCRIPTION OF THE PREFERRED EMBODIMENTS

Overview

The present invention involves an information system that is designed with a realization that any application running on the system is not only a fixed set of features and behavior, but also comprises all of the changes applied to the system throughout its lifetime. In other words, the architecture in accordance with the present invention anticipates that changes will occur even if the features and behavior modified by those changes is unknown when the application is first deployed. In prior systems these features and behavior are implemented in procedural application code. In contrast, one aspect in accordance with the present invention is that database queries are implemented as data and stored as database entries. This data is interpreted at runtime by a "crucible client" in accordance with the present invention to provide the desired application functionality and behavior. In this manner, the system in accordance with the present invention enables the database schema to be modified in order to grow and change to meet the users' needs while the system remains running.

Because procedural application code does not need to be modified and compiled to implement new functionality, the system in accordance with the present invention can be rapidly adapted to new features and behavior without compromising the proven quality and robustness of the underlying code. The procedural core program or programs can be extensively tested to ensure quality and reliability. Because core programs do not change, the new functionality can be deployed rapidly with little or no additional verification.

The present invention is preferably implemented in a query language based on SQL-92, the current SQL standard. However, the present invention is readily adaptable to implementations in other database languages such as proposed standards SQL3 and Object Query Language (OQL). The query system in accordance with the present invention provides several new features that are unavailable in standard SQL implementations. Specifically, the present invention supports ad hoc queries, data import and export, and the construction and execution of triggers and constraints. The extension to SQL-92 in accordance with the present invention also provides a mechanism for relationship traversal and selection based on classes and subclasses.

Generally stated, the present invention involves a database management system including classes that contain methods for implementing database access requests (i.e., queries) by instantiating database objects. In accordance with the present invention, queries are stored with database relationships to the classes, attributes and relationships that they traverse and access. Queries are stored within the database, so that they can be retrieved and reconstructed at a later time. This provides referential integrity between queries and the things they access, as well as providing a convenient means to access related queries. By attaching all queries generated from a particular class to the class itself the present invention provides a basic structure for query re-use.

Figure 1:
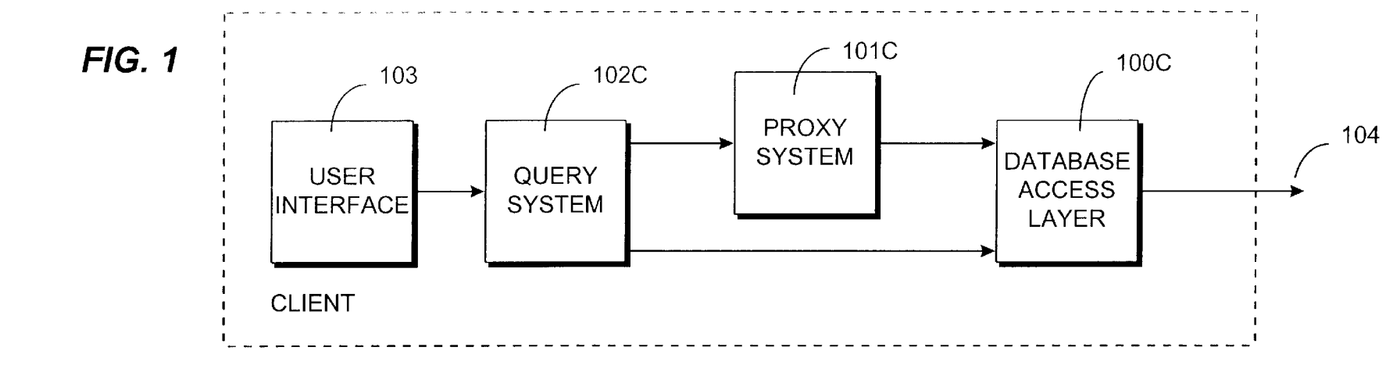
FIG. 1 shows in block diagram form basic components of a client-side query system in accordance with the present invention.
Figure 2:
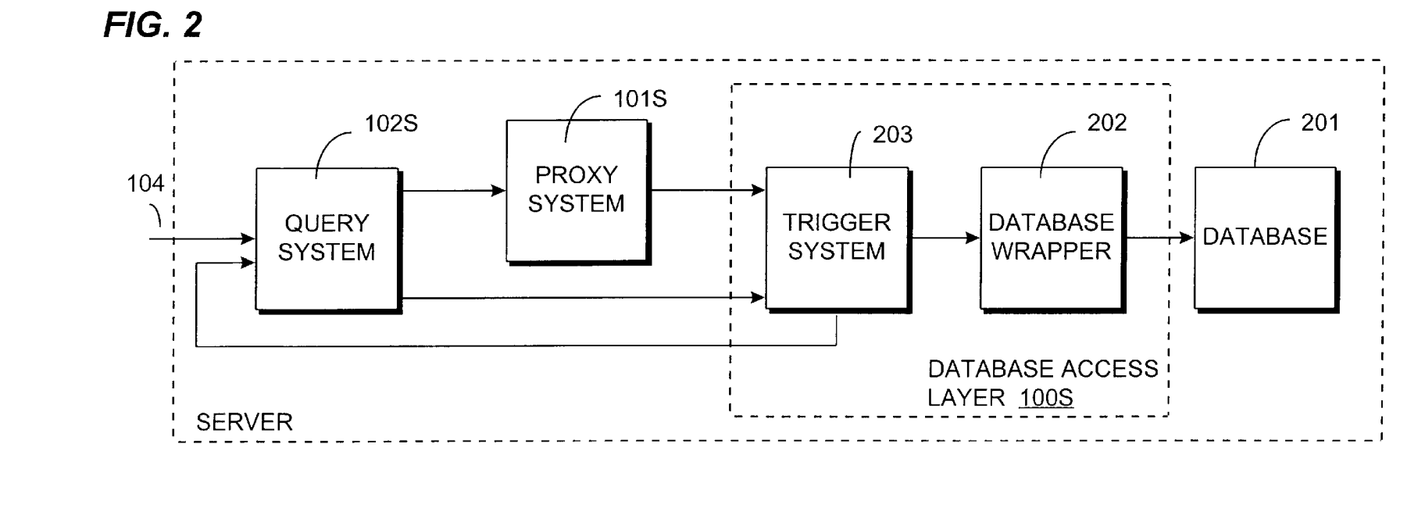
FIG. 2 shows in block diagram form basic components of a server-side query system in accordance with the present invention.

As shown in FIG. 1 and FIG. 2, both the client and server comprise a group of classes called the database access layer (DAL) 100C and 100S that provide basic support for persistent storage of database objects. In FIG. 1, the client side elements are designated with a "C" suffix while similarly numbered layers in the server side (shown in FIG. 2) are designated with an "S" suffix for ease of reference. DAL layer 100C provides functionality for open and closing a database connection, reading and writing object attributes and relationships, and for starting, committing and aborting transactions.

Riding on DAL 100 is the proxy system 101. Proxy system 101 contains proxies that comprise opaque representatives for the persistent database objects in DAL 100. Proxies provide a higher and more convenient abstraction for object manipulation as compared to the persistent objects stored in DAL 100. Rather than reading and writing object attributes and relationships through DAL 100 the present invention constructs proxies for the persistent objects that are modified. The present invention manipulates the Proxies in the desired fashion, and then commits a group of Proxies enmasse (i.e., saves a group of proxies back to persistent object storage in DAL 100) in a single transaction.

Query system 102 provides yet a higher level of abstraction. It rides on top of both DAL 100 and Proxy system 101. Query system 102 enables access to groups of Proxies. Query system 102 provides set operations on the accessed groups of proxies and includes various methods for manipulating a group of proxies as a whole. Query system 102 also provides projections of the object data that is accessed. This feature enables the user to view collections of attributes from multiple objects as though they were a single attribute. In general, client-based tools will interact primarily with query system 102. Additionally, when this more abstract layer does not provide needed functionality the present invention allows direct manipulation of proxies and/or calls directly to DAL 100.

A query system layer 102C resides on the client while a query system layer 102S shown in FIG. 2 resides on the server. There is also a server proxy system 101S corresponding to client proxy system 101C shown in FIG. 1. DAL 100C on the client comprises a wrapper on a communication channel 104 between client and server. The DAL 101S on the server is a wrapper 202 on an actual database 201, such as MATISSE, Informix, or the like. A "wrapper" comprises re-useable code that encapsulates procedural code in an application (such as a communication protocol or a database). Once encapsulated the item becomes an object.

Whenever possible, the client query system 102C bundles up full queries and send them to the server query system 102S for execution. Remote execution helps reduce the number of objects transmitted through the communication channel. Intensional queries (i.e., queries that have not yet been executed during a prior query) are the best candidate for remote execution. Extensional queries (i.e., queries including components that have been executed previously and stored with their results) that are nested are preferably executed locally (i.e., on the client computer). To execute a query locally, a copy of a portion or all of the database is copied across the communication channel from the server to the client, which adds significant overhead to the query process.

The server query system 102S is used for more than remote execution of queries. It is also the core to the trigger system 203. Trigger system 203 comprises one or more classes that contain methods and variable declarations for dynamically maintaining state of the queries and persistent database objects stored in DAL 100C. As proxies are created, modified, associated to other proxies, and deleted, trigger system 203 executes "triggers" and "constraints" that have been previously stored in the database attached to the object classes in the schema. Generally, a "trigger" is a combination of events and conditions that may activate a state transition. In a specific implementation of the present invention, a trigger specifies a series of actions to be performed, either before or after a write or a commit. Triggers are also tied to classes, attributes and relationships. Triggers are implemented as a series of Updates, Inserts and Deletes that are executed conditionally based on a Where predicate in an ongoing query.

A constraint restricts possible occurrences or allowable combinations in relationship sets, interactions, object classes, and the like. In the specific implementation described herein, a constraint is essentially a predicate to a CQL query that checks to see if the current object state matches some preselected criterion. Constraints are fired when a class, attribute or relationship is modified, and are used to maintain correct state. In a particular example, the present invention implements constraint as a SQL Where predicate. The constraint executes the Where predicate, and if the result is false the transaction is aborted.

Updating, inserting and deleting are the basic operations performed on data in a database. Because these operations are available in query system 102S it is convenient to use the already implemented capabilities of query system 102S as the basis for triggers and constraints. In accordance with the present invention, triggers and constraints not only use queries, they are queries. The same user interface used to write ad hoc queries and define hierarchies is extended to provide an interface to triggers and constraints. In a typical use, a trigger is written and tested on a client, and when it works saved to the database 201. When a trigger or constraint is executed it may in turn fire off other triggers and constraints.

Figure 3:
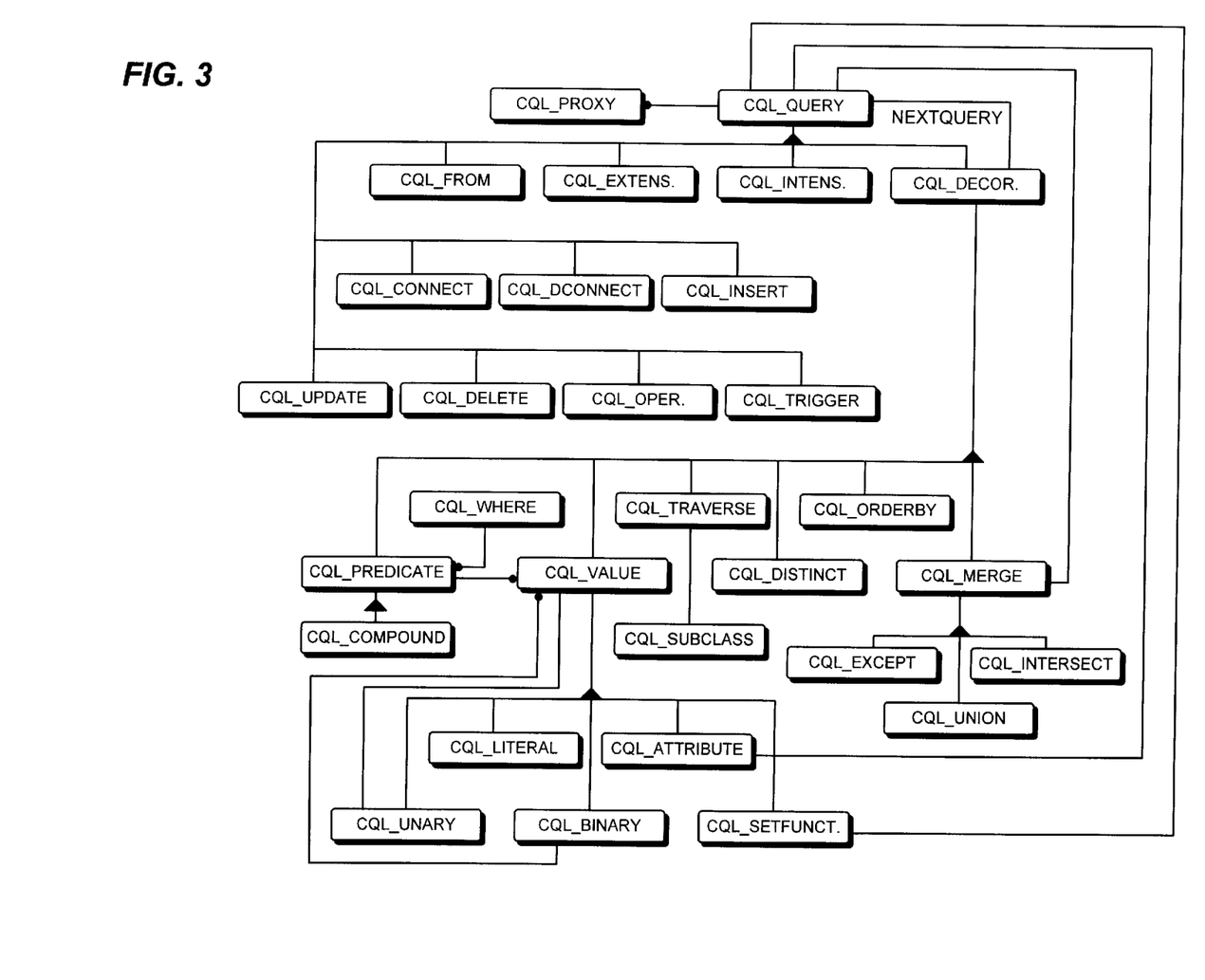
FIG. 3 shows a in chain graph form a class structure implementing a query system in accordance with the present invention.

FIG. 3 shows a directed acyclic graph (DAG) illustrating various subclasses included in an exemplary query class that implements query system 102C in a particular implementation. The subclasses shown in FIG. 3 and described hereinbelow are selected to provide all basic functionality required to access a database or database management system, including object-oriented databases, relational databases and non-relational (i.e., flat) databases. In a sense, the subclasses shown in FIG. 3 are selected to execute primitive functionality for a database management system. Because much primitive functionality is common to many or all database types, many of the subclasses shown in FIG. 3 are useful in accessing relational, non-relational, and object oriented databases. It is contemplated that the present invention may be implemented using more or fewer subclasses than shown in FIG. 3 to implement greater or lesser functionality. Subclasses that are illustrated but not described herein are shown only for completeness, and do not comprise a material portion of the invention.

Many of the classes are descendants of the CQL__Decorator class, which provides the NextQuery relationship used to chain query component objects together. In the following description of the CQL syntax and BNF, it is useful to refer to the subclassing shown in FIG. 3. As a general rule a subclass shown in FIG. 3 labeled "CQL__X" comprises methods that can be passed to a query object that implement the "X". For example, CQL__From includes methods to implement a FROM clause of a query and CQL__Connect includes methods to implement a Connect clause in a query. For ease of understanding, the Syntax description provided hereinbelow does not expressly refer to the subclass providing the associated method, but the nomenclature used herein makes that relationship clear.

Query Language Syntax

The present invention includes a query syntax processed by client query system 103C that enables access to a variety of relational and object databases 201. The query system in accordance with the present invention is implemented to expect only minimal support from the underlying database 201. In the case of object-oriented database management systems (OODBMSs), there is currently only weak support for SQL style queries. In the case of relational database management systems (RDBMSs), there is great support for relational queries, but little or no support for object queries.

The query system in accordance with the present invention rides lightly on the underlying database. Client query system component 103C is responsive to queries in a system-specific language referred to as "Crucible Query Language" or CQL. The mapping from Crucible Query Language to the underlying database is handled in the server-side database wrapper 202. The mapping of CQL queries to MATISSE and Informix has proven straightforward.

The CQL language in accordance with the present invention extends the SQL query syntax to use "→" to define relationship and subclass traversal and to use "." to indicate attributes. These new notations are available (i.e., may be used) nearly everywhere within the query definition. A CQL query that includes a traversal constrains the target by a specified sub-type yet allows the returned object to be of a parent type. In this manner, the returned object type allows all of the attributes and relationships of the parent object type to be used. Prior query systems, in contrast, that returned objects of the specified sub-type restricted the selection but did not subtype the query and therefore did not allow access to subtype attributes.

In the following example traversals are used in both the SELECT clause and WHERE predicate.

```
SELECT Patient->Physicians->EmployedBy.CompanyName
FROM Patient WHERE Patient.Age < Patient->Spouse.Age
```

The difficulty with the preceding query in prior systems is that there is an implied join between Patients, Spouses, Physicians and Hospitals that must be carefully managed. The new query system iterates through all traversals to form the full cross product of associated objects. In the preceding example, if a Patient had two Physicians and two Spouses the query would correctly execute for each Physician/Spouse pairing.

Subclass traversals can be interspersed with Relationship traversals, as in the following example:

```
SELECT Physician->Intern->Advisor.LastName
FROM Physician
``` where Intern is a subclass of Physician. The subclass traversal restricts the class of physicians, making available attributes and relationships defined within the subclass. Although the selection is from all Physicians, only instances of the Intern subclass are returned.

CQL in accordance with the present invention extends the query system to do more than just Select statements. Just as in SQL the present invention extends Update, Insert, Delete, Connect and Disconnect. Their function is as follows:

Update: Access a group of specified objects, and modify their attributes and relationships.
Insert: Create a new object and set the values of its attributes and relationships.
Delete: Delete the specified group of objects.
Connect: Open a connection to the specified database, and return the Session object that is created.
Disconnect: Close a database connection.

A more detailed description of the CQL query language syntax and the query system features and capabilities follows.

1. Select Queries

An example select query is:

| | |
|---|---|
| SELECT | P.LastName, Today() − P.DOB, P->EmployeeOf.CompanyName |
| FROM | Patient As P, P->PatientOf AS Doc, P-> Spouse AS S |
| WHERE | (P.Age < S.IQ) and Doc.Salary > 100000) |
| ORDERBY | P.LastName, P.FirstName, sqrt(P.Age) |

The preceding query illustrates several of the features of the Select statement in accordance with the present invention. As described above, "→" is used to specify relationships and "." is used to specify attributes. In a particular example, relationship traversal can be specified anywhere, and attributes can be specified anywhere except the FROM clause. This convenience greatly improves the ease with which complex queries are written.

The SELECT clause specifies the projection or result of the query (i.e., P.LastName, Today( )-P.DOB, P→Employee Of Company Name in the example above). A particular implementation supports three options: the name of a single class or correlation name optionally followed by relationship traversals, an asterisk, or a series of attribute specifications separated by commas. The asterisk implies the name of the class in the FROM clause, and is ambiguous unless only one class is named. If a series of attributes is specified their values are concatenated and returned as a single string.

The FROM clause specifies the target objects to be searched. It can include class names, relationship traversal and subqueries. Targets may be given correlation names within the FROM clause by using he AS keyword. In other clauses the correlation name can be used instead of the full classname/relationship. Note that when relationships are used in other clauses it is as if they had also been listed in the FROM clause. That is, SELECT Patient→Spouse FROM Patient is semantically equivalent to SELECT S FROM Patient, Patient→Spouse as S.

The WHERE clause comprises a series of predicates. Simple predicates use comparison operators on attributes and literal values. Compound predicates use Boolean OR, AND and NOT to combine the simple predicates. Attribute comparison is based on the Semantic Type of the attribute.

The optional ORDERBY clause allows you to establish a sort order on the objects return by the Query.

Additionally, several functions are added to the query syntax. Functions may be used wherever an attribute or literal might have been used. Included in the list of functions are Log, Ln, Cos, Sin, Sqr and Sqrt. Available math operators are +, −, *, / and %. There are also several intrinsic functions to support date arithmetic and comparisons, including Today( ), Day( ), Month( ), and Year( ). Set Functions are available that take entire queries as their argument. They include Min( ), Max( ), Sum( ) and Avg( ). There is also the Coun( ) set function that takes a relationship traversal, and returns the successor count.

Queries can be combined through the Intersection, Union and Except keywords. Parenthesis can be used to override the order of precedence, which is in the order specified above.

2. Connection Queries

The Connect and Disconnect statements are used to establish and break, respectively, a connection with a remote database server.

Example connection queries are:

```
CONNECT  dbl@jeeves USER long DBTYPE matisse
         SERVICE dev
DISCONNECT dbl@jeeves USER long
```

In previous systems remote connections were established by making databaseOpen( ) and vLogin( ) calls through a Database or the Database Manager. These connection queries in accordance with the present invention are added so that these routine chores could be accomplished through a single interface. This allows utilities such as an Export Tool to only have to deal with the Query System, and not to have to deal with Proxy or Database sub-systems.

Optional arguments to the CONNECT statement include USER, PASSWORD, DBTYPE and SERVICE. On successful execution of a Connect statement the connection query returns the Session object that was created for the connection. On successful execution of the Disconnect statement the query returns any pending messages associated with the terminated Session.

3. Insert Queries

The Insert statement creates new persistent objects of the specified class such as in the following example:

```
INSERT INTO Patient VALUES (LastName = 'Long',
    FirstName = 'James', PatientId = '1234',
    PatientOf = (SELECT * FROM Physician Where
    PhysicianId = 'A4637')
```

The value list in parentheses comprises a series of attribute or relationship names, each followed by an equal sign then a new value. In the case of the Attributes the value comprises a literal or a query that has a projection. In the case of a Relationship the value comprises a query that returns the object or objects to which the newly created object will be associated.

Inserts are not conditional. Each time they are executed they will create exactly one object of the specified class.

4. Update Queries

The Update statement is used to modify an existing object of the specified class as in the following example:

```
UPDATE P
FROM Patient AS P, P->Spouse AS S
WHERE S.PatientID = '473798'
VALUES (P.LastName = S.LastName)
```

The syntax is like a Select combined with an Insert's Value clause. The Select portion access the Object(s) to modify, and the Value portion describes the modification to perform. Both the Update and Insert use a non-standard form of the Value( ) clause as compared to standard SQL. In standard SQL the Update form is SET col1=col2=val2 . . . The Insert is col1, col2, col3 VALUE (val1, val2 val3), where specifying the columns is optional.

5. Delete Queries

The Delete statement essentially a Select statement with the SELECT keyword replaced with DELETE:

```
DELETE S FROM Patient As P, P->Spouse as S
WHERE P.Deceased = TRUE and S.Insurance = FALSE
```

When executed the Delete query will deleted all the objects return by its query from the database 201. Desirably, after execution the Delete holds the Proxies of the deleted objects in Proxy system 101C and/or 101S.

6. Constraints

The Constraint is a predicate that is tied to a Class, Attribute or Relationship. An example Constraint follows:

```
CONSTRAINT PasswordRequired ON User.Password
WHERE User.Password <> ""
```

Before a transaction is committed each Class Constraint, as well as the Attribute and Relationship constraints for all modified or created properties, will be evaluated by the Trigger System. If any Constraint fails then the transaction is aborted.

7. Triggers

A Trigger is a side effect associated with the modification of a Class, Attribute or Relationship. Each Trigger has a name followed a keyword as in the example:

```
TRIGGER AssignPatientId BeforeCommit
ON Patient WHERE Patient.PatientID = ''
DO (UPDATE Patient VALUES (PatientID = 1 + Max
    (Select P.PatientId FROM Patient AS P))
```

In this example the keyword (BeforeCommit above) defines when the trigger will be fired. Next is the On clause that is essentially a Select statement. This allows a Trigger to be fired conditionally based on the evaluation of a predicate. The final portion of the Trigger is the Do clause that specifies a series of subqueries that will be executed. Multiple subqueries within the Do clause are separated by commas.

8. Operations

In many ways an Operation is like a Trigger. Each operation should have a name, be attached to a class, and should have a DO( ) clause that specifies some series of Inserts, Deletes and Updates to perform. A major difference between the Trigger and the Operation is with respect to parameters. An Operation replaces formal parameters with actual parameters before execution.

Intensional and Extensional Queries

An intensional query is one that accesses a group of objects from the database 201 according to some rule, such as:

SELECT * FROM Patient.

An intensional query is given a QueryDef that is the name of the class to access, and optionally a simple WHERE clause. When the intensional query is executed it sends it's simple query to the database, and returns a collection of proxies.

In contrast, an extensional query is one that is tied to a specific set of objects that it will return. The extensional query is created through a persistent proxy of itself from the database. When it is constructed it already has its resultant proxy list.

Intensional queries can become Extensional queries by giving them a collection of Proxies with the vEstablishGatewayAs( ) method call. An intensional that becomes extensional in this way will then ignore calls to the vExecute( ) method. When it is told to save itself to the database with vMakePersistent( ) it will save as an Extensional Query.

An advantage of the foregoing procedure is that user interface software is allowed to compose or describe views in a hierarchy. One view might be given the query:

```
SELECT    Patient->Episodes FROM Patient WHERE
          Patient.DOB < 1956:07:01.
```

If this query were simply executed it would retrieve all Patients in the database that were over 40 and return all of their Episodes. But this Dynamic View might be nested within another Dynamic View. The outer View might have the query:

```
SELECT    P->Patients FROM Physician As P WHERE
          P.LastName = 'Bukstein'
```

In this case the Query of the nest View would be given all Bukstein's patients to start with. When it executed it would only return Episodes of Bukstein's Patients who were over 40. The nested query is not made extensional to begin with because it is unknown whether an intensional query will be given proxies as an entry point into the database until it happens. The query chain is constructed earlier and the syntax of the query does not provide this information. Because the present invention stores queries as persistent database objects, it is necessary to know the class in order to properly save the query.

A standard technique for defining the syntax of a computer language is to use Backus-Naur Form (BNF). Although the present invention can be readily implemented with alternative syntax commands, the following BNF describing CQL in accordance with the present invention is provided for purposes of completeness and to better enable complete understanding of the inventive concepts described herein. The BNF description provided below uses the following conventions:

1. Syntactic categories are defined using the form: syntactic_category::=definition 2. Words inside angle brackets < > represent syntactic categories (i.e. nonterminals).

3. Square brackets ([ ]) surround optional items.

4. A vertical line (|) separates alternatives.

Note that the BNF provided in accordance with the present invention is a similar to but less extensive than the BNF for SQL-92. The parenthesized number following each production is the page number where a corresponding definition is found in the SQL-92 specification.

```
<any query>     ::=
        <connection specification>
      | <disconnection specification>
      | <insert specification>
      | <update specification>
      | <query expression>
<connection specification>    ::= (p.306)
        CONNECT [TO] <database> @ <host> <connection options>
<connection options>    ::=
        USER <user>
      | PASSWORD <password>
      | DBTYPE <database type>
      | SERVICE <service>
<disconnection specification>    ::= (p.306)
        DISCONNECT [FROM] <database> @ <host>
      | DISCONNECT [FROM] <database> @ <host> USER <user>
<insert specification>    ::= (p.513)
        INSERT [INTO] <class name>
        VALUES  (    <insert attributes> <insert relationships> )
<insert attributes>    ::=
        <attribute name> = <value expression>
      | <attribute name> = <value expression>
<insert attributes>
<insert relationships> ::=
        <relationship name> = <any query>
      | <relationship name> = <any query> , <insert relationships>
<update specification> ::= (p.513)
        UPDATE <correlation name> <table expression>
        VALUES ( <insert attributes> <insert relationships> )
<delete specification> ::= (p.513)
        DELETE <correlation name> <table expression>
<constraint specification> ::=
        CONSTRAIN <constrain name>
        ON <class> [ · <attribute> | ->
<relationship> ]
        <WHERE clause>
<trigger specification> ::=
        TRIGGER <trigger name> <trigger timing>
        ON <class> [ · <attribute> | ->
```

```
<relationship> ]
        WHERE <predicate>
        DO ( <any query> [,<any query>. . . ] )
<trigger timing> ::=
        AFTERRELATIONREMOVE
        | AFTERRELATIONADD
        | AFTERATTRIBUTEWRITE
        | AFTERCREATE
        | BEFOREDELETE
        | AFTERDELETE
        | BEFORECOMMITATTRIBUTE
        | AFTERCOMMITATTRIBUTE
        | BEFORECOMMITRELATIONSHIP
        | AFTERCOMMITRELATIONSHIP
        | BEFORECOMMITCLASS
        | AFTERCOMMITCLASS
<operation specification> ::=
        OPERATION <operation name>
        WITH ( <arglist> )
        DO ( <any query> [,<any query>. . . ] )
<query specification> ::= (p.498)
        SELECT [ DISTINCT | ALL ] <select list>
<table expression>
<select list> ::= (p.498)
        <asterisk>
        | <object identifier>
        | <object identifier>.<asterisk>
        | <object identifier> <value list>
        | <value list>
<value list> ::=
        <value expression>
        | <value expression> , <value list>
<correlation name>   ::= <identifier>
<identifier> ::= (p.41)
        Leading alpha followed by alphanumeric and
underscore.
        Identifiers in SQL are not case sensitive.
<table expression> ::= (p.498)
        <FROM clause> [ <WHERE clause> ] [ <orderby
clause> ]
<FROM clause> ::= (p.498)
        FROM <table reference> [, <table
reference>. . . ]
<table reference> ::= (p.498)
        <object identifier> [ AS <correlation name> ]
        | <flattened oid> [ AS <correlation name> ]
        | <subquery> [ AS <correlation name> ]
<object identifier> ::=
        <class name>
        | <class name> <relationship spec>
        | <correlation name>
        | <correlation name> <relationship spec>
<relationship spec> ::=
        -> <relationship name>
        | -> <relationship name> <relationship spec>
        | -> <subclass name> <relationship spec>
<class name>         ::= <identifier>
<attribute name>     ::= <identifier>
<relationship name>  ::= <identifier>
<flattened oid>  ::= <database> @ <host> : <oid>
<database>       ::= <identifier>
<host>           ::= <identifier>
<oid>            ::= An alphanumeric string
containing no
                special characters.
<subquery> ::= (p.497)
        <left paren> <query expression> <right paren>
<query expression> ::= (p.497)
        <query term>
        | <query expression> UNION [ALL] <query term>
        | <query expression> EXCEPT [ALL] <query term>
<query term> ::= (p.497)
        <query primary>
        | <query term> INTERSECT [ALL] <query primary>
<query primary> ::= (p.498)
        <query specification>
        | <subquery>
<orderby clause> ::= (p.499)
        ORDER [BY] <value list> [ ASC | DESC ]
<WHERE clause> ::= (p.499)
        WHERE <search condition>
<search condition> ::= (p.494)
        <boolean term>
        | <search condition> OR <boolean term>
<boolean term> ::= (p.494)
        <boolean factor>
        | <boolean term> AND <boolean factor>
<boolean factor> ::= (p.495)
        [ NOT ] <boolean primary>
<boolean primary> ::= (p.495)
        <predicate>
        | <left paren> <search condition> <right paren>
<predicate> ::= (p.495)
        <comparison predicate>
        | <between predicate> ??
        | <in predicate> ??
        | <like predicate> ??
        | <exists predicate> ??
<comparison predicate> ::= (p.495)
        <value expression> <comp op> <value
expression>
<comp op> ::= (p.127)
        = | <> | > | < | >= | <=
<value expression> ::= (p.495)
        <numeric value expression>
        | <string literal>
<string literal> ::= (p.86)
        Any set of characters delimited by
apostrophes.
        To use an apostrophe within a string quote it
with a
        second apostrophe.
<numeric value expression> ::= (p.495)
        <term>
        | <numeric value expression> <plus sign> <term>
        | <numeric value expression> <minus sign>
<term>
<term> ::= (p.495)
        <factor>
        | <term> <asterisk> <factor>
        | <term> <solidus> <factor>
<factor> ::= (p.495)
        <numeric primary>
        | <sign> <numeric primary>
        | <unary function> ( <numeric primary> )
<unary function>::=
        SQRT
        | SQR
        | SIN
        | COS
        | LOG
        | LN
<numeric primary> ::= (p.496)
        <unsigned numeric literal>
        | <class name> . <attribute name>
        | <correlation name> . <attribute name>
        | <set function specification>
        | <left paren> <value expression> <right paren>
<set function specification> ::= (p.497)
        <set function type> ( <scalar subquery> )
<scalar subquery> ::= (p.497)
        SELECT <value expression> <table expression>
        | <value expression>
<set function type> ::= (p.497)
        AVG | MIN | MAX | SUM | COUNT
```

OPERATION

Query system 102C and query system 102S comprise object-oriented query classes that include variable declarations and methods for constructing query objects. One of the methods in the query class is a constructor method that constructs query objects from, for example, user supplied input or from a textual query definition stored in a persistent query object. The CQL query may be parsed and when parsed looks very much like a conventional SQL query. However, queries are actually processed and stored as atomic query components that are referentially linked back to the data of the database's logical schema. The only information that needs to be coded is the query component types (such as the WHERE clause, the value clause, and the like) if these components should ever change. It should be noted that this kind of change is not an application change. Query system 102C, for example, constructs a data query by referring to a class map that is stored as data. The class map identifies what attributes in a class map to and from attributes in an query object. Essentially, the class map specifies how objects link to each other and how they can pass messages.

Queries are constructed from a textual query definition as in:

CQL_Query(CQL_String sQueryDef, CQL_String sGroupName);

This query definition conforms to the query language BNF as specified hereinbefore. The CQL prefix in terms represented herein indicates that the associated suffix term is a CQL-specific extension to standard SQL implementations. The CQL_query may be a Select, Update, Connect, etc.

Queries may also be constructed given the Proxy of a persistent query as in the example:

```
CQL_Query( CQL_Proxy   proxyOfQuery,   CQL_String
    sGroupName );
```

Queries are stored in the database as several query objects chained together. The proxy supplied to this constructor (i.e., proxyOfQuery in the statement above) is the first persistent query in the stored chain of query objects. As each query is constructed on the client the persistent relationships are traversed and additional constructor calls are made for all the sub-queries within the persistent query chain.

The query class also comprises methods enabling the query object to save the proxies to the database. Proxies are saved to the database by first creating them on the client from a textual Query Definition, and then calling their method vMakePersistent( ) as follows:

void vMakePersistent(CQL_String sQueryName );

This method takes as an argument the name under which the query may latter be accessed. Care should be taken in naming these persistent queries to aid query reuse.

When a query is executed it performs its defined function against an open database using a method contained in the query object such as:

void vExecute( );

In the case of a Connect query, execution causes a database connection to be established and the Session proxy returned. For a Select query execution causes a group of Proxies to be brought over from the database according to the various clauses of the Select statement.

Instead of being executed a Query may be given a group of Proxies through the vEstablishGatewayAs( ) method illustrated below:

```
void vEstablishGatewayAs( CQL_ProxyList
            proxylistOfGateway );
void vEstablishGatewayAs( CQL_ProxyList
            proxylistOfGateway, CQL_String
            sAlias="" );
```

When this occurs an Intensional query will become Extensional. This query will ever after ignore calls to vExecute( ). Once a query becomes Extensional it remains that way until it is destructed. This mechanism is used to nest subqueries.

A single query may comprise multiple intensional subqueries, such as, SELECT * FROM Patient as P, Physi-cian AS D where P.LastName=D.Lastname. Executed as it stands this query would compare all Patients to all Physicians. If we were to call vEstablishGatewayAs( ) and pass in one Physician Proxy and then call vExecute( ) the query would compare all Patients against the specified Physician. And if you called vEstablishGatewayAs( ) a second time and passed in a collection of 3 Patient Proxies, the query would then execute against the 3 Patients and 1 Physician, only. If you were to then save the Query to persistent storage it would be saved as two Extensional queries forever bound to the specified Patients and Physician.

It is useful to note that the second method invocation includes the Alias or Correlation name of the query to which the command is directed. Many of the Query methods include a Alias as the final argument so that a method may be directed to a particular Query in the chain. This is described in greater detail hereinbelow with reference to the structure of query chains.

Once a query is executed the query object executes methods to dispense (i.e., returns to the user) the Proxies it has accessed from the database.

```
void vProxyFirst(CQL_String sAlias="");
void vProxyNext(CQL_String sAlias="");
CQL_Boolean bProxyValid(CQL_String sAlias="");
CQL_Proxy proxyCurrent(CQL_String sAlias="");
```

In a particular example, the application programming interface (API) uses a standard First/Next iterator idiom to index through the returned proxies. In addition to reading the collection of Proxies, in many cases you can also write to the collection. Using statements such as:

```
CQL_Boolean bInsertable(CQL_String sAlias="");
void vProxyInsert(CQL_Proxy proxyToInsert,
            CQL_String sAlias="");
void vProxyRemove(CQL_Proxy proxyToRemove,
            CQL_String sAlias="");
void vProxyRemoveCurrent(CQL_String sAlias="");
void ProxyRemoveAll(CQL_String sAlias="");
``` the query system 103C can ask a Query object whether or not it can be written to through the bInsertable( ) method. If it returns TRUE then you can insert and remove selected Proxies.

The following queries show examples of queries that can and cannot have Proxies insert or remove:

```
SELECT P->Dependent FROM Patient AS P WHERE P.PID =
'A78932'
SELECT P FROM Patient AS P WHERE P.LastName =
'Jones'
```

The first Query can have a Proxy inserted. The result would be to hook the select Patient to the new Proxy through the Dependent relationship. The second query is not insertable. Insertion into a set based on attribute values is not allowed in the preferred implementation.

Another feature in accordance with a preferred implementation is that every Query can be asked for its value using statements such as:

```
CQL_String    svalue();
CQL_String    sValue(CQL_String sAttribute,
                    CQL_String sAlias="");
```

In many cases that value is explicit in the SELECT definition, such as, SELECT P.Lastname FROM Patient AS P. After execution we can use a First/Next mechanism to index through the collection of all Patients, accessing each Lastname by making a call to sValue( ).

In addition to the explicit value returned from a Query, it is also desirable to access attributes from any intermediate object within the query. Consider the Query:

```
SELECT *   FROM Patient->PatientsOf->PracticeAt as H
           WHERE H.Location = 'Riverside'.
```

Once executed, this Query returns by default the Patients of all Physicians who practice at the Riverside clinic. As you First/Next through the resultant Proxies you can query any object for any attribute. For example, sValue("Patient", "LastName")

returns the Patient's lastname, while sValue("Patient->PatientsOf", "PhID")

returns the Physician ID of the current Physician. This mechanism can be used to access various attributes one at a time so that they can be properly formatted for export.

Since the values read comprise object attributes from the various proxies returned from query execution, it is a straightforward process to write, as well as read, these values as follows:

```
CQL_Boolean    bReadOnly(
                    CQL_String sAlias="" );
CQL_Boolean    bWritable(
                    CQL_String sAlias="" );
void           vWriteValue(
                    CQL_String sNewValue,
                    CQL_String sAttribute="",
                    CQL_String sAlias="" );
void           vWriteAllValues (
                    CQL_String sNewValue,
                    CQL_String sAttribute="",
                    CQL_String sAlias="" );
```

If an attribute is not specified then the explicit value of the SELECT is written to. It is generally safer to specify the attribute you intend to modify.

Query objects in accordance with the preferred implementation include methods to provide the standard Proxy API to Refresh, Update, and Delete whole groups of Proxies. The sublclasses CQL_Update, CQL_Delete, CQL_Trigger shown in FIG. 3 comprise methods used to construct these query objects.

```
void           vRefreshCurrent( );
void           vRefreshGroup( );
void           vDeleteCurrent( );
void           vUpdateCurrent( );
void           vUpdateGroup( );
```

Employing this technique enables users of the Query System 102C to handle all aspects of Proxy manipulation without having to know anything about Proxies.

CQL Queries received from the user interface 103 or as stored text strings from the proxy of a persistent query are parsed in a conventional manner. Each portion of the parsed query statement is implemented as a single component query object. These components query objects are then connected together as a query chain, and only the terminal end (also called a stub end) of the chain is visible to user interface 103C. This terminal end passes method calls, such as vExecute( ), down the chain as needed.

Each portion of the query statement is implemented as a single component. These components are then connected together to form a query chain or query net, and only the terminal end of the query chain (also called a query stub) is visible to the user of the query. This terminal passes method calls, such as vExecute( ), down the query chain as needed. At run time when a query executes the query executor reads the query-chain and uses information from the class map to read database 201 and retrieve objects. Query objects are instantiated as application-neutral proxies and served up to the user interface 103 processes.

Figure 4:
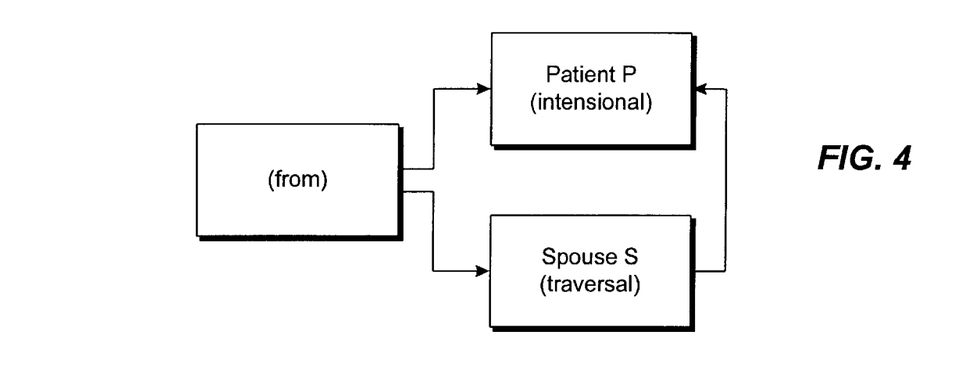
FIG. 4 illustrates a first query chain implemented in accordance with the present invention.

A useful way to understand query construction in accordance with the present invention is to follow the development of query chains that represent particular query expressions. FIG. 4 through FIG. 7 illustrate development of a query chain or query net using a method in accordance with the present invention. In FIG. 4, the query component:

SELECT * FROM Patient AS P, P->Spouse AS S is graphically illustrated in directed acyclic graph form. In FIG. 4–FIG. 7, each block represents an atomic query component object. The notation within each block enclosed in parentheses indicates the subclass shown in FIG. 3 from which the query component object was generated. The unidirectional lines coupling indicate relationships between the query component objects where these relationships are specified by data within the objects and implemented by messages passed between the query component objects.

As shown in FIG. 4, three query component objects are instantiated and chained together to form the query. A From object passes messages to both the intensional object PatientP and the traversal object Spouse S. The Spouse S object passes messages back to the Patient P intensional object to implement the query.

Figure 5:
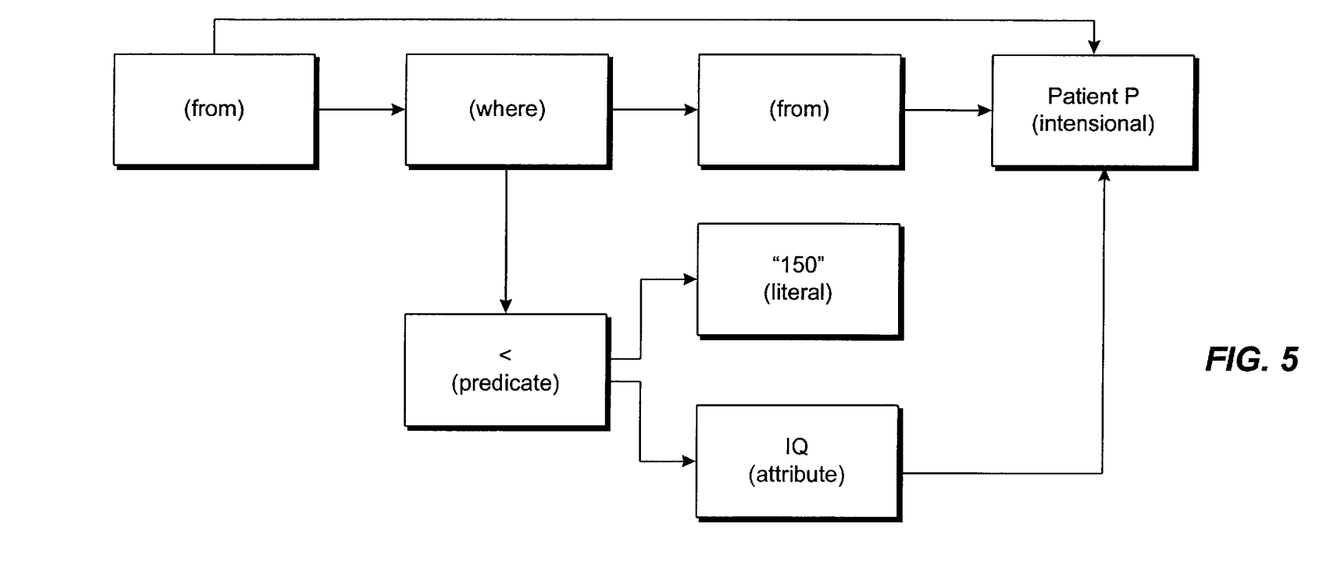
FIG. 5 illustrates a second query chain implemented in accordance with the present invention.

The DAG shown in FIG. 5 illustrates the query:

SELECT P.Age FROM Patient AS P WHERE P.IQ<150 which includes a WHERE clause. As shown in FIG. 5, FROM object passes messages to the WHERE object and to the Patient P intensional object. The WHERE object passes the message onto a second FROM object which in turn passes messages to the Patient P intensional object. The where object also passes a message to the predicate object that handles the condition expressed in the condition of the query. The predicate object communicates with the IQ attribute object and the "150" literal object. The attribute object couples to the Patient P intensional object to provide results of the predicate.

Figure 6:
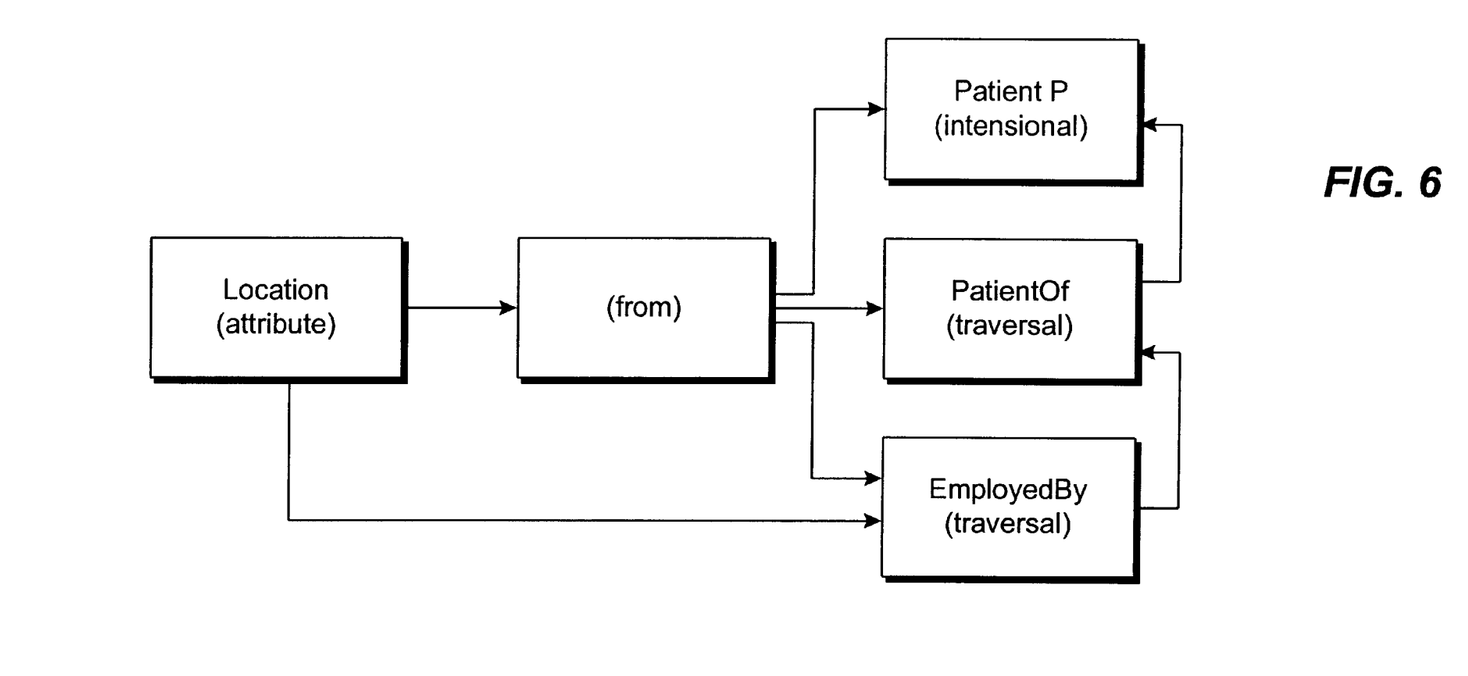
FIG. 6 illustrates a third query chain implemented in accordance with the present invention.

The graph shown in FIG. 6 illustrates the query:

```
SELECT    P->PatientOff->EmployedBy.Location    FROM
Patient AS P
``` which includes multiple traversals in the SELECT clause. As shown in FIG. 6, an attribute object Location passes messages to the from object and the EmployedBy traversal object. The FROM object passes messages to the Patient P intensional object, the EmployedBy traversal object, and to the PatientOf traversal object.

One useful aspect of the query system in accordance with the present invention is that Extensional, Intensional and Traversals are contained within the From query decorator (shown in FIG. 3). This is useful for performing join-like queries such as:

```
SELECT P.LastName, C.Location FROM Physician as D,
D->Patients as P, D->Clinics as C WHERE P.Age <
C.Age
```

Each Physician may have multiple Patients and Clinics. The FROM clause has the job of iterating through all Patients for every Clinic for each Physician. This cross product is managed by ordering traversal dependencies. When you send the Next message to the FROM it iterates through the dependent queries before the thing they depend on. In this way we process the query for every combination of attributes in the WHERE clause.

Figure 7:
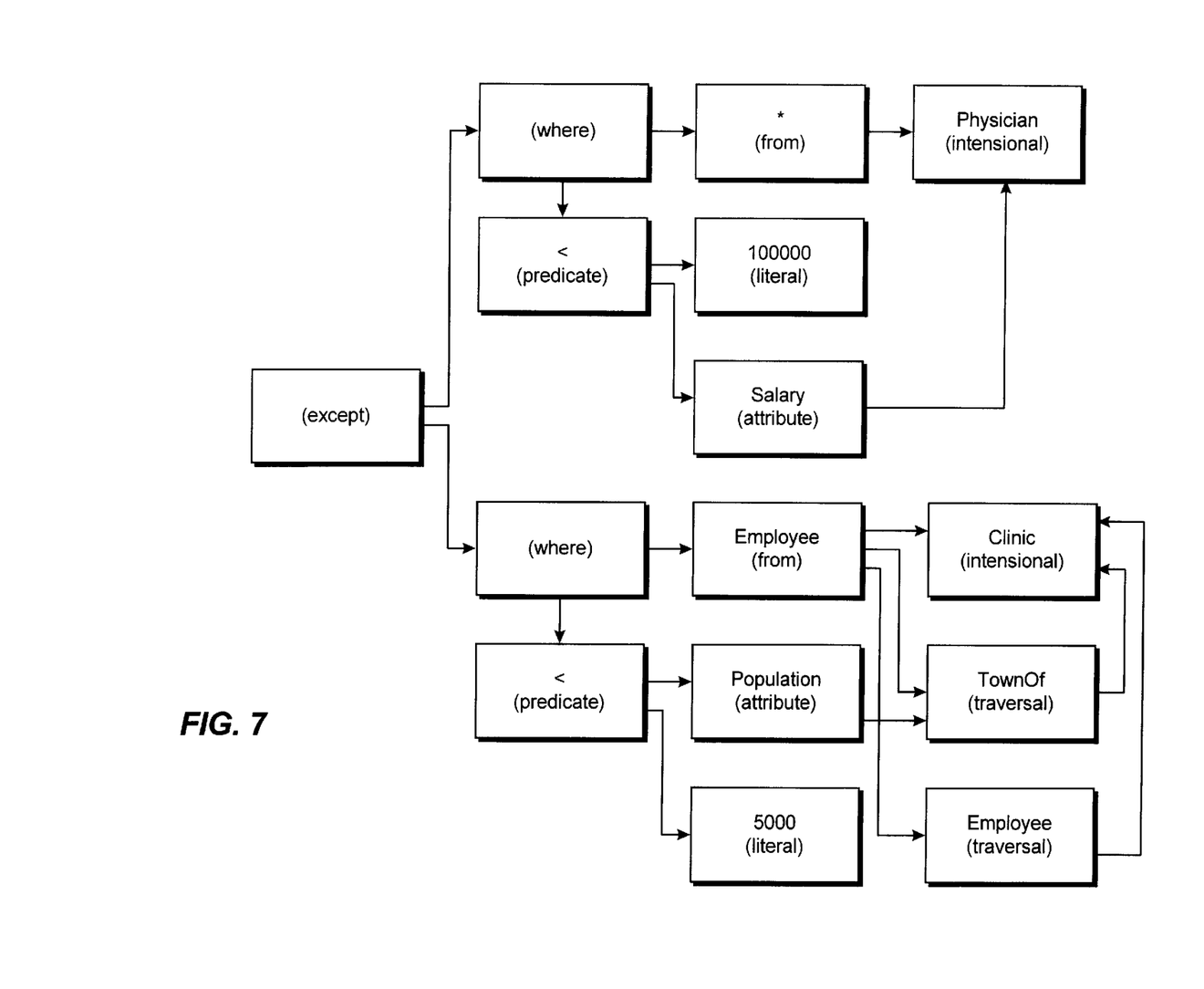
FIG. 7 illustrates a fourth query chain implemented in accordance with the present invention.

The DAG shown in FIG. 7 represents a somewhat more complex query:

```
SELECT * FROM Physician
WHERE Physician.Salary < 100000
EXCEPT
SELECT C->Employee FROM Clinic AS C, C->TownOf as T
WHERE T.Population < 5000
```

The detail of the objects and couplings between objects is apparent from the drawing and is not described further to ease understanding. Significantly, the except object manages two otherwise independent query chains.

A significant feature in accordance with the present invention is that entire query chains are stored within the database 201. Each query component object is attached to the CQL subclass (shown in FIG. 3) to which it corresponds and thereby saved as a persistent query object. This provides a convenient way to access all named queries associated with a particular class. Significantly, the query objects are stored with only data as the objects themselves do not include procedural code. When a query chain is saved only the lead query object or stub object receives a name. Only a named query associated with a class may be re-used.

Figure 8:
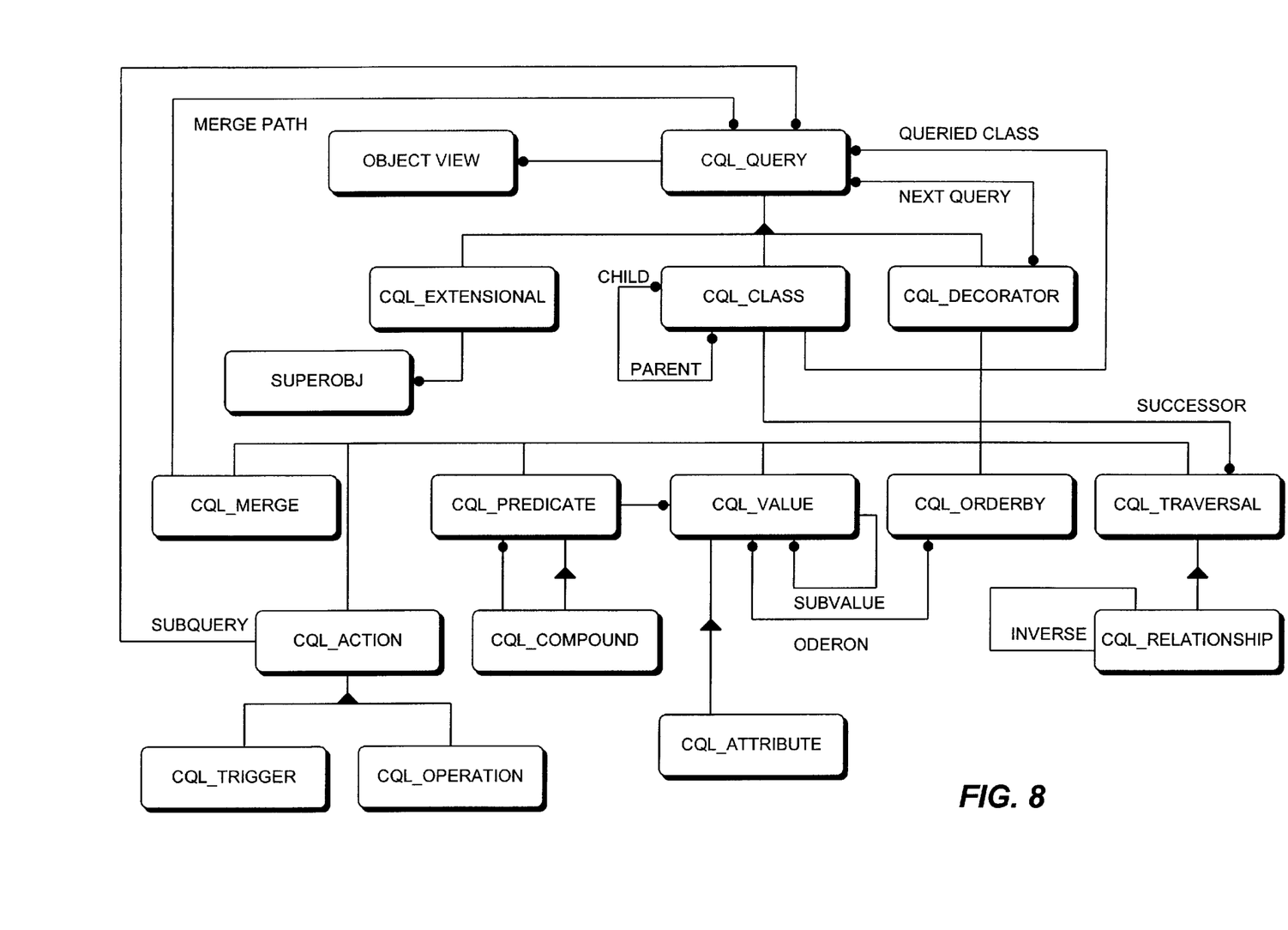
FIG. 8 shows a directed cyclic graph illustrating persistent storage of query objects in accordance with the present invention.

FIG. 8 illustrates in DAG form the structure of persistent queries stored in database 201 by query system 102S (shown in FIG. 2). As shown in FIG. 8, not all of the objects that can be constructed from client-side query subclasses (shown in FIG. 3) are represented within the database. For instance, there are no UNION, INTERSECTION nor EXCEPT queries in the database. Instead, all three are made persistent through the CQL_Merge class. When a UNION query is made persistent it creates and stores a CQL_Merge object, and writes "UNION" as the query definition. The definition is then used to determine the type of object to construct when the query chain is rebuilt on the client.

Significantly, each query object is made persistent by storing data that will allow the query object to be rebuilt when it is desired to reuse the query object. The integrity of the stored query objects can be verified using any available data integrity technique. Because data integrity verification techniques are more reliable and faster than code verification techniques, the structure and method in accordance with the present invention offer high reliability and can be verified readily. Moreover, maintenance and upgrades are readily performed. Further, because data can be changed without halting a computer system, the underlying functionality of the query system in accordance with the present invention can be upgraded without halting the database function simply by modifying the stored data. When the query is rebuilt, the new functionality from the upgrade is immediately available.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for accessing a server database in a database computing system in response to a request by an application program executing in an application computing system, wherein a communications facility is connected to couple the application computing system to the database computing system, and wherein the application computing system includes a first interface for providing application programs executing at the application computing system with an interface to the database computing system, the method comprising the steps of:

generating a first query in the application computing system;

parsing the first query to provide query components;

providing a query class comprising a plurality of subclasses wherein each query subclass corresponds to each query component, and wherein each subclass contains variable declarations and methods;

for each query component, constructing query component objects from the corresponding query subclasses and containing data from each query component that satisfy the variable declarations in the subclass;

chaining the query component objects together; and making the chained query component objects persistent by saving data describing the chained query component to persistent storage.

2. The method of claim 1 wherein the step of chaining comprises providing message paths within each query component object that allow messages to be passed from each query component object to selected other query component objects.

3. The method of claim 1 wherein the step of providing a query class further comprises:

selecting each of the plurality of subclasses to implement primitive database functionality.

4. The method of claim 1 wherein the step of providing a query class further comprises:

providing an update subclass including methods to access a group of specified objects, and modify the attributes and relationships of the specified objects;

providing an insert including methods to create a new object and set the values of its attributes and relationships;

providing a delete subclass including methods to delete the specified group of objects;

providing a connect subclass including methods to open a connection to the specified database, and return the session object that is created; and providing a disconnect subclass including methods to close a database connection.

5. The method of claim 1 wherein the step of providing a query class further comprises providing a traversal subclass including variable declarations and methods implementing query object traversal.

6. The method of claim 1 wherein the step of making persistent further comprises saving the data describing the chained query component with the subclass corresponding to that query component object.

7. The method of claim 1 further comprising the steps of:

generating a second query in the application computing system, wherein the second query refers to the first query;

parsing the second query to provide query components;

for each query component in the second query, constructing query component objects corresponding to the query subclasses, wherein one of the query component objects comprising methods to access the component objects of the first query; and chaining the query component objects together.

8. The method of claim 1 wherein the step of making persistent further comprises extensionally saving data describing the chained query component to persistent storage along with the result produced by the executed chained query components.

9. The method of claim 1 further comprising the steps of:

modifying the database schema at runtime by modifying an attribute of at least one subclass;

identifying a persistent query components saved with the subclass having an attribute modified during the modifying step; and modifying data within the identified persistent query component that refers to the modified attribute.

10. A query system for a server database in a database computing system, the query system responsive to a request by an application program executing in an application computing system, the query system comprising a first interface within the application computing system providing application programs executing at the application computing system with an interface to the database computing system;

a second interface within the application computing system providing application programs executing at the application computing system with a user interface;

a query module coupled to receive user supplied query data from the second interface;

a parsing module coupled to receive the query data and to generate a plurality of query components;

an object-oriented query class comprising a plurality of subclasses, wherein each query component has a corresponding subclass, and wherein each subclass contains preselected attributes, variable declarations and methods to enable the subclass to construct a query component object, wherein each query component object contains data from one of the query components;

a chaining module coupled to receive the query component objects and link the query component objects to generate a query chain; and a storage module coupled to receive the chained query component objects and make the chained query component objects persistent by saving data describing the chained query component to persistent storage.

11. A database system comprising:

a database server in a database computing system, the database computing system having a processor, an input/output device, and a data storage device;

a database access system in an application computing system, the application computing system having a processor, an input/output device, and a data storage device;

a communications facility to couple the application computing system to the database computing system;

a first interface within the application computing system providing application programs executing at the application computing system with an interface to the database computing system;

a second interface within the application computing system providing application programs executing at the application computing system with a user interface;

a query system coupled to receive a query statement from data entry means and generate a plurality of query data components;

a proxy system coupled to receive the query data components and generate a query component object from each query data component, wherein the query component objects comprise data and methods for implementing the query language statement;

a database access layer coupled to the proxy system to receive messages from and send messages to the query component objects, and coupled directly to the query system to receive query language messages from and send query language messages to the query system;

the query system further comprising:

a parsing module coupled to receive the query language statement and to generate a plurality of query data components;

an object-oriented query class comprising a plurality of subclasses, wherein each query data component has a corresponding subclass, and wherein each subclass contains preselected attributes, variable declarations and methods selected to enable the subclass to construct the corresponding query component object;

a chaining module coupled to communicate with the query component objects in the query system and link the query component objects to generate a query chain; and a storage module coupled to receive the chained query component objects and make the chained query component objects persistent by saving data describing the chained query component to persistent storage.

* * * * *